United States Patent Office

2,999,283
Patented Sept. 12, 1961

2,999,283
BINDER COMPOSITIONS
Bruce Paul Barth, Piscataway Township, Middlesex County, N.J., assignor to Union Carbide Corporation, a corporation of New York
No Drawing. Filed Oct. 1, 1958, Ser. No. 764,511
9 Claims. (Cl. 22—193)

This invention relates, in general, to molds and forms such as are employed in the casting of metal articles and, more particularly, to compositions useful in the formation of such molds and forms.

Large volume production of cast metal parts is advantageously carried out in shell molds made of granular material, such as sand, bonded with a thermosetting resin in the desired contour. Extensive use of the shell mold method of casting has been retarded by the absence in the art of a completely satisfactory method for fabricating these shell molds from the granular material. One of the better known methods mechanically mixes finely divided, powdery thermosetting resin with the sand or other grains, then heats the mixture until the resin fuses and anchors the grains in place. This method, however, does not provide shells of adequate strength for many applications and frequently the strength varies unpredictably from shell to shell and even from one portion of a shell to another due to the more or less haphazard distribution of the resin particles among the grains.

Shells of improved uniformity and of greater strength are obtained by a method which individually coats the grains with resin prior to fusion of the mixture to form a shell mold. This "pre-coating" method is being increasingly employed because of the end-product advantages it affords. The chief drawback to the use of this method lies in the binder compositions which are currently available. The physical property and process limitations of the heretofore almost exclusively used phenolic novolak resins have prevented the widespread acceptance of the "pre-coated grain" method.

To be satisfactory for the "pre-coated" method, the binder composition must be fluid enough, i.e. of low enough viscosity, to rapidly and uniformly coat the grains. Also, the melt viscosity of the coating must be sufficiently low to permit adequate flow of the binder to adjacent grains to ensure good bonding therebetween.

In practice, the novolaks, which are advantageous as binders because they provide shell molds of generally superior strength, i.e. about 300 p.s.i. tensile strength, and are quite stable, i.e. permit storage at ordinary temperatures for long periods, are coated onto the grains in one of two ways, each of which has attendant diadvantages which negative to some extent their advantages.

The first coating procedure is a hot melt process wherein the resin is crushed and powdered, then mixed mechanically with sand which has been preheated to a temperature high enough to melt the resin on contact. The sand thus becomes coated to a greater or less extent with the resin. A hardener, usually hexamethylenetetramine, is then mixed in at a lower temperature, to prevent premature curing of the resin coating. This process is economical in the consumption of resin but is not favored in foundries because of the high initial equipment cost and the tendency of the resin to become erratically cured. The chief fault in the hot melt/hardener technique is the failure to ensure adequate and even distribution of the hardener throughout the resin. Poorly cured portions of the shell mold are weak and are potential trouble spots.

Alternatively, the novolaks can be applied to the sand or other grains by an organic solution technique. The resin and hardener are co-dissolved in an organic solvent and the solution is mixed with sand which is ordinarily unheated or only slightly heated. The organic solvent is generally removed during a subsequent mixing or mulling operation. The solution technique is less expensive in terms of initial equipment outlay but is more expensive to operate due to the necessity of having organic solvent handling and recovery steps. Additionally, and most important, the organic solution technique introduces toxicity, and severe fire and explosion hazards which frequently can not be tolerated under any circumstances.

It has been suggested that the foregoing difficulties could be circumvented by the use of a water-soluble resole resin. Such a practice eliminates the need for costly and hazardous organic solvents; obviates the hardener distribution problem because these resins being self-reactive require no external hardening agent; and, for a given solids content, a water solution is of lower viscosity than an organic solvent solution, hence uniform distribution of the resin over the grain surfaces is facilitated.

Water-soluble resole resins are not without their drawbacks, however. They have been found unsatisfactory in shell molds generally because of their notoriously inferior strength. The cause of the poor strength of water soluble resole bonded molds is traceable to the chemical nature of the resole itself. As the resole is coated onto the sand grains, it must be advanced to the solid-but-thermoplastic "B" stage in order to be dry and non-sintering at the generally ambient temperatures of 70–80° C. Otherwise, the coated grains aggregate and are unpourable.

In causing the resole resin to advance to the "B" stage, however, such an increase in the melt viscosity of the resin is also brought about that the flow properties of the resole are severely impaired. In adequate flow of the resin binder during formation of the shell mold causes poor bonding between the grains and consequent low tensile strength. In fact, known resole bonded molds are considerably below the level of strength required for many applications.

A processing difficulty is also encountered in the use of resole resins since they have extremely poor stability. Storage even at room temperatures for more than a few days is markedly deleterious.

It is an object, therefore, of the present invention to provide coated grains which easily form strong bonds in molds and similar structures.

It is another object to provide coated grains which are non-sintering, and free flowing.

Another object is to provide a coated grain having a coating which is stable for long periods and is easily varied in melt viscosity and hence readily adapted to various end-uses and is so easily handled as to be completely suited for automatic metering.

It is still another object to provide a method for preparing shell molds of easily variable strengths.

It is a further object to provide a method for preparing shell molds which does not employ organic solvents and hence is highly desirable in foundries.

A specific object is the provision of molds and similar structures from coated grains and a method therefor.

These and other objects are accomplished in accordance with my invention by coating sand or other grains with a thermosetting composition comprising trimethylolphenol and a water soluble carbohydrate; and thereafter, if desired, forming the so-coated grains into a mold or the like.

The coated grains of this invention can be prepared by known procedures for making thermosetting resin coated sands in foundries.

In my preferred procedure, pre-heated sand and a solution comprising trimethylolphenol, a water-soluble carbohydrate and a minimal amount of water are intimately mixed together in such manner that the binder composition is uniformly distributed onto the surface of the sand grains, the water is eliminated, and the coating is advanced to a fusion point of about 150–200° F. Conveniently, this is accomplished in a muller of the type widely used to prepare sand-resin mixtures or resin coated sand. Other mixing means, however, such as "Pug" mill or the like, can also be used.

The fusion temperature, as used herein, is the lowest temperature at which the coating fuses within 15 seconds under atmospheric pressure, and can be determined conveniently by pouring a thin, continuous line of coated sand onto a Parr bar (or Dennis apparatus or other temperature gradient bar) then, after 15 seconds, sweeping the bar lightly, starting at the cool end, with a camel's hair brush and measuring the temperature of the bar at the low temperature end of the line of fused material which adheres to the bar.

The desired fusion point can be attained by appropriately controlling the mulling period and the temperature of the mix during the mulling cycle. Within rather wide limits, time and temperature are correlative, i.e., an increase or decrease of the one can be balanced by a commensurate decrease or increase, respectively, of the other. In practice, the optimum temperature for mixing is best determined experimentally since it depends on many factors including the temperature, mass, and design of the muller; the carbohydrate-to-trimethylolphenol ratio, water content and pH of the coating composition; and other equipment, process and composition variables which affect the rate at which heat is dissipated from the mix and/or the reactivity of the coating composition. For example, all other things being equal, a binder solution which is relatively low in solids content requires a relatively greater amount of heat to volatilize the water. Hence, a higher initial sand temperature is required to attain a given fusion point in a prescribed time. Conversely, if the muller itself is preheated, the rate of heat loss from the mix is reduced and a lower initial sand temperature will provide the desired fusion point in a given time.

Good results can be obtained with initial sand temperatures ranging from about 25° F. to about 375° F. This temperature is not narrowly critical, and other temperatures can be used, depending on the particular equipment, process and composition involved and the fusion point desired.

Good quality products can be made with mulling times as short as two minutes; but it is generally preferable to moderate the initial sand temperature sufficiently to give a mulling cycle of about five minutes so that the fusion point can be controlled more reliably. Still lower temperatures and longer mulling times can be used with equally good results, but these are needlessly uneconomical in most instances.

It is preferred that the coated sand have a fusion point of about 150–200° F., since this gives a favorable combination of non-sintering behavior, and therefore good pourability at room temperature, and good flow at high temperatures and consequently superior shell strength. If the fusion point is much below 150° F., the coated sand is unduly prone to sinter—especially in humid atmospheres. If the fusion point is over about 200° F., the coating has poor flow and the bonded structure has less strength. It is particularly preferred in my invention that the coated sand have a fusion point of about 160–180° F., since this gives the optimum combination of non-sintering and melt flow characteristics.

The water-soluble carbohydrate/trimethylolphenol composition may be applied to the sand dry by a hot melt procedure, but is preferably applied as an aqueous solution. This solution should contain at little water as is consistent with economic practice. Water is the preferred, and not the sole suitable solvent or diluent. Methanol, ethanol and other organic solvents can be used, but they are more costly and introduce toxicity, flammability and explosion hazards. Their use is therefore not generally advantageous except, perhaps, for special cases, as for example when fast drying or the need to employ relatively cold sand is so important as to outweigh the above-cited disadvantages. Additionally, aqueous solutions are readily adaptable to automatic metering which provides increased productivity and lower operating costs.

Trimethylolphenol, or 2,4,6-tris(hydroxymethyl)phenol, is a white crystalline compound melting at about 84–85° C. It can be used in the solid form or, more conveniently, in the form of a solution as for example a 70% aqueous solution such as sold by the Bakelite Company under the trade designation BRLA–1030, which solution has a viscosity at 25° C. of about 50–70 cst. and a pH of about 7 to 8. Trimethylolphenol has relatively good stability. In crystalline form, it can be stored for many months, possibly even a year or more; and even aqueous solutions thereof are appreciably more stable than water-soluble phenolic resoles.

Trimethylolphenol is readily soluble in water, low molecular weight alcohols, phenols; moderately to sparingly soluble in low molecular weight ketones and esters, nitromethane and other polar solvents; and substantially insoluble in hydrocarbons, halogenated hydrocarbons and other relatively non-polar solvents. An aqueous solution thereof can be diluted freely with water or with a lower aliphatic alcohol such as methanol, ethanol, isopropanol, etc., or with moderate amounts of acetone or other low molecular weight, water soluble, polar solvents, or with combinations of the foregoing.

Typical methods of preparation of trimethylolphenol are detailed in United States Patents 2,889,373 and 2,889,374 to C. Y. Meyers.

In general any water-soluble carbohydrate or mixtures thereof can be used, e.g., dextrose, maltose, sucrose, invert sugar, dextrin, corn syrup, starches, etc. Corn syrups having a dextrose equivalent (D.E.) of 50–65 are preferred for their optimum balance of fluidity, handling ease, non-sintering properties and high final strength. The carbohydrate, whether a solid or a syrup, such as commercial corn syrups which contain of the order of 80% solids, can be simply mixed with the commercial trimethylolphenol solution and the resulting solution used without further dilution or concentration. While the solution can be diluted further or concentrated to a higher solids content if desired, these steps are generally unnecessary since the advantages so obtained can ordinarily be accomplished more economically by appropriately adjusting some other process condition. I have found that compositions containing from about 10 to about 300 parts by weight of water soluble carbohydrate per 100 parts by weight of trimethylolphenol provide particularly desirable thermoplasticity behavior in the "B" stage since they can be advanced to a "B" stage condition and remain dry and no-sintering even at room temperatures. Further the compositions within the above range have good flow characteristics at and above their fusion temperatures and therefore effect firm bonding between the grains.

Increased strength of the bonded coated sand structure is achieved when the carbohydrate is present in the composition to the extent of about 25 to 100 parts by weight per 100 parts by weight of trimethylolphenol; and these compositions are therefore preferred. Shell molds can be formed from sand coated with compositions within this range which have a tensile strength at least equal to or in many cases considerably greater than shell molds formed from equal amounts of novolak coated sand grains and they are less costly as well. I have found that molds and forms of greatest strength can be obtained from sand grains coated with compositions of my invention containing 55–60 parts by weight of a water-soluble carbohydrate per 100 parts by weight of trimethylolphenol. Sand coated with these latter coating compositions are particularly preferred in my invention.

The higher the concentration of water soluble carbohydrate in the coating composition the lower the cost;

but I have found that the lower the water-soluble carbohydrate to trimethylolphenol ratio in the coating the less tendency there is for the coated grains to sinter in humid atmospheres. Also, the higher the water-soluble carbohydrate concentration, especially above a 1:1 ratio of carbohydrate to trimethylolphenol the poorer the bond strengths obtained. Of course, this can be overcome by the use of heavier coatings, i.e. higher proportion of binder to sand.

It is to be remembered that maximum shell strength is not always required. Many applications particularly small shell molds, require strengths of only about 200 p.s.i. My invention is also advantageous in these applications because of the ease of altering the shell strengths obtained. The feature of the invention which permits increased carbohydrate concentration and hence decreased cost at lower shell strength enables the foundry operator to tailor the shell mold strength to his needs and thereby lower his costs. Both shell strength and cost increase with increasing binder content in the shell mold. Therefore, the lowest binder content which provides the required strength is to be preferred. In general, from about 2 to about 8 or more parts of binder (dry weight) per 100 parts by weight of sand is satisfactory, but other factors, such as the particular binder composition, the types of sand or other grain, i.e., relative coarseness, particle size, surface condition, whether washed or unwashed, and particular end-use requirements, ultimately determine the optimum binder/sand ratio. The binder compositions of my invention are more versatile than heretofore known novolaks in that the melt viscosity, and hence the flow during cure, of the composition can be easily controlled simply by varying the time and/or temperature of the mulling operation. Thus, a binder of the same composition can be used where a comparatively low melt viscosity is advantageous such as in blowing shells, as well as for dump box molding, an application where relatively higher melt viscosities are normally required.

As the pH of the water soluble carbohydrate/trimethylolphenyl composition is lowered, its reactivity increases, and commensurately lower sand temperatures and/or shorter mulling cycles can be used. However, shell strength is also reduced by about 10–35%. The best balance of properties is usually obtained at pH 4–8; satisfactory but less strong products can be made with the pH above 8 or as low as 1.

It has been found that a small amount of waxy lubricants i.e. about 2–5% based on binder solids, gives improved shell strength. Preferred lubricants are calcium stearate and Acrawax (sold by Glyco Products Co.). Other natural or synthetic waxes and wax-like substances can also be used. Best results are obtained by adding the lubricant to the hot sand prior to the addition of the resin or to the coated sand during the 2nd stage of the mulling cycle wherein the coated grains are being "broken down," i.e., de-aggregated.

The following examples are illustrative of the practice of my invention.

In the description of the composition of my invention which follows, I have found it most convenient to express the coating weight of the various coating solutions as the "N.V.M." content. This expedient is employed because in the ordinary sand coating processes, inter-reaction between the trimethylolphenol and the carbohydrate eliminates water and some trimethylolphenol is also lost either through volatilization and/or steam distillation or mechanical entrainment in the water vapor. Therefore, "nonvolatile matter," or "N.V.M." content is a useful first approximation of the actual weight of the coating, which is always less than the combined weights of the trimethylolphenol and carbohydrate charged to the initial sand/coating solution mixture because of the above described losses which occur during processing. The N.V.M. content for a solution is determined in the following manner:

About 1.5 g. of the coating solution is heated to 275° F. for three hours in a 2 inch diameter ointment tin and the residue is weighed. The residue weight expressed as a percentage of the original sample weight is the N.V.M. content of the solution.

EXAMPLE 1

A coating solution containing 70 parts by weight of trimethylolphenol and 40 parts by weight of carbohydrate was prepared by mixing 100 parts by weight of a 70% aqueous solution of trimethylolphenol (60% N.V.M.) (Bakelite Co.'s BRLA–1030) and 48.8 parts of corn syrup containing 81.8% solids and having a dextrose equivalent of 63% ("Sweetose C" sold by the A. E. Staley Co.). The pH of the solution was adjusted to 7.0±0.1 with 75% phosphoric acid. The solution had a N.V.M. content of 65%.

2270 g. of unwashed Juniata sand (AFS 90), containing about 4% clay by weight, was heated to approximately 350° F. in an oven, then charged to a Lancaster muller, the 12 inch dia. bowl and mulling wheel of which had been pre-heated for 15 minutes in a 600° F. oven and mulling of the sand was begun. When the sand temperature reached 340° F., 4 g. of calcium stearate was added as a lubricant; the temperature declined to 310° F., and 140 g. of the above coating solution, which contained 100 g. combined weight of initial trimethylolphenol and carbohydrate, but only 91 g. N.V.M., was added. Thus the N.V.M./sand ratio was 4:100. The actual weight of trimethylolphenol and carbohydrate charged to the mixture was somewhat higher, about 4.4 parts by weight per 100 parts by weight sand.

After a minute of mulling, the temperature of the mix was 230° F.; after theree minutes, the temperature was 240° F. After six minutes of mixing the binder and sand, one half of the mixed material was removed from the bowl and cooled. After an additional sixteen minutes, or twenty-two minutes mixing overall, thte remaining half of the mix was removed and cooled. Each of the cooled batches was mulled in an unheated muller for five minutes at room temperature. This operation reduced the aggregated coated sand particles to a mass of finely divided free-flowing material having a fusion point of 150° F., for the material mixed for six minutes, and 180° F. for the material mixed for twenty-two minutes.

"Dogbone" shaped specimens 3 inches long and ¼ inch thick were prepared from the coated sand to enable testing of their tensile strength. The back plate of the mold was heated to 400° F. and the ¼ inch thick cavity plate with three "dogbone" shaped holes was fited thereonto. The coated sand prepared above was poured into the cavities and leveled off with a spatula. The filled mold was then heated in a 600° F. oven for periods of one and two minutes. The tensile strength of the bars obtained was measured in a Tinius-Olsen machine using a jaw separation speed of ¼ inch/minute. The following results were obtained:

*Table I*

| Composition | Sand Temp., °F. | Mulling Time (min.) | Fusion Point, °F. | Tensile Strength (p.s.i.) | |
|---|---|---|---|---|---|
| 1A | 310 | 6 | 150 | [1] 475 | [2] 587 |
| 1B | 310 | 22 | 180 | [1] 515 | [2] 499 |

[1] Cured one minute at 600° F.
[2] Cured two minutes at 600° F.

RESOLE RESIN COATINGS

To demonstrate the marked superiority of trimethylolphenol over resole resins commonly employed in the sand coating art a coating solution similar to that of Example 1 was made with a commercial, water-soluble resole resin substituted for the trimethylolphenol. The resole used was made by reacting 1 mole of phenol and 2.3 moles of aqueous formaldehyde in the presence of a catalytic amount of caustic, for two hous at 70° C., neutralizing the reaction mixture with HCl and vacuum dehydrating it to 70% N.V.M.

70 parts by weight of the resole diluted to 60% N.V.M. was mixed with 40 parts by weight of the carbohydrate "Sweetose C" and pH adjusted to 7.0 with 75% H₃PO₄. 140 g. of the solution was added to 2270 g. of sand mixed with 4 g. of calcium stearate heated to 315° F. Half of the batch was mulled 6 minutes and the other half 12 minutes. The results are given below. Results of Example 1 are included for comparison.

Table II

| Composition | Sand Temp., °F. | Mulling Time (min.) | Fusion Point, °F. | Tensile Strength (p.s.i.) [1] |
|---|---|---|---|---|
| 1A | 310 | 6 | 150 | 587 |
| Resole A | 315 | 6 | 143 | 296 |
| 1B | 310 | 22 | 180 | 499 |
| Resole A | 315 | 12 | 178 | 304 |

[1] Cured for two minutes at 600° F.

Sand coated with a conventional resole alone had a fusion point of 178° C. and a greatly inferior tensile strength of 180 p.s.i. after curing for two minutes at 600° F. This resole is of the type widely used to coat and/or bond abrasive grains and was made by reacting one mole of phenol with 2.1 moles of aqueous formalin in the presence of a catalytic amount of sodium carbonate, for two hours at 80° C., then vacuum dehydrating the reaction mixture to a viscosity of about 5000 cps.

The reasons for the distinct superiority of the trimethylolphenol carbohydrate composition coated sands of this invention over those coated with a phenolic resole-carbohydrate combination are not fully understood, hence, we do not wish to be bound by any particular theory; but it is believed to be due, at least in part, to the fact that trimethylolphenol contains no reactive hydrogen atoms, i.e., no aromatic-ring hydrogens are located ortho or para to the phenolic hydroxyl group; whereas a resole contains appreciable concentrations of such reactive hydrogens.

A methylol group, such as is present in trimethylolphenol or a resole, can react with either (A) a reactive hydrogen, or (B) another methylol group, or (C) the hydroxyl groups of the carbohydrate. The first-named reaction, i.e., with a reactive-ring hydrogen, apparently goes much more rapidly than the other two, and therefore proceeds almost exclusively while any appreciable quantity of reactive-ring hydrogen is available. This reaction acts to crosslink, hence to immobilize, the molecules. Consequently, reactions (B) and (C) take place, if at all, only to the extent that (i) there are still enough methylol groups left therefor, and (ii) the system is sufficiently "uncrosslinked" that the methylol and carbohydrate hydroxyl groups possess enough mobility to enter into each other's sphere of reaction. Since trimethylolphenol contains no reactive-ring hydrogens, the carbohydrate hydroxyls can compete successfully for the methylol group (against the methylol auto-condensation); and a large degree of trimethylolphenol-carbohydrate interreaction can take place.

In a carbohydrate-resole system, on the other hand, the methylol-reactive ring hydrogen reaction predominates. Consequently, the amount of actual carbohydrate-resole inter-reaction which occurs is relatively small. It is quite likely that this system is largely a mechanical mixture, with much of the carbohydrate merely enmeshed in the crosslinked phenolic resin matrix.

EXAMPLES 2–3

The procedure outlined above for Example 1 was repeated except that in Example 2, the coating solution was added at a sand temperature of 295° F. and the entire batch was mulled for twelve minutes in the hot muller; and in Example 3 the sand temperature when the coating solution was added was 332° F. and the mulling period was six minutes for the entire batch. The following results were obtained:

Table III

| Composition | Sand Temp., °F. | Mulling Time (min.) | Fusion Point, °F. | Tensile Strength (p.s.i.) [1] |
|---|---|---|---|---|
| 2 | 295 | 12 | 161 | 504 |
| 3 | 332 | 6 | 199 | 237 |

[1] Cured two minutes at 600° F.

The effect of a higher fusion temperature as indicated by the data above is to lower the tensile strength due to less flow of binder occurring between the grains.

EXAMPLES 4–6

The procedure of Example 1 was followed in making a coating solution by mixing 120 parts by weight of a 70% aqueous solution of trimethylolphenol (Bakelite Company's BRLA–1030) and 29.4 parts by weight of "Sweetose C." The pH of the coating solution was adjusted to 7.0±0.1 with 75% phosphoric acid. The resulting solution contained 84 parts by weight of trimethylolphenol and 24 parts by weight of carbohydrate and had an N.V.M. content of 63%. Accordingly, 144 g. of the solution was needed to provide the desired 91 g. N.V.M. per batch. Actually the combined weight of the trimehylolphenol initially added and carbohydrate was 102 g.

The addition of 144 g. of the above-described coating solution was made at three different sand temperatures and the respective mixes were mulled for various periods as indicated below:

Table IV

| Composition | Sand Temp., °F. | Mulling Time (min.) | Fusion Point, °F. | Tensile Strength (p.s.i.) [1] |
|---|---|---|---|---|
| 4 | 320 | 12 | 159 | 389 |
| 5A | 328 | 6 | 170 | 323 |
| 5B | 328 | 11 | 196 | 179 |
| 6 | 328 | 6 | 187 | 309 |

[1] Cured two minutes at 600° F.

EXAMPLES 7–9

Procedure of preceding examples was followed using 70 parts by weight trimethylolphenol (100 parts by weight of a 70% aqueous solution of Bakelite Company's BRLA–1030) and 60 parts by weight of carbohydrate (added as 73.4 parts by weight of "Sweetose C"). Again the pH was adjusted to 7.0±0.1 with 75% phosphoric acid solution. 134 g. of the solution, 91 g. N.V.M., and 99 g. of initial reactants, was used per batch. The following results were obtained.

Table V

| Composition | Sand Temp., °F. | Mulling Time (min.) | Fusion Point, °F. | Tensile Strength (p.s.i.) [1] |
|---|---|---|---|---|
| 7 | 260 | 10 | 154 | 309 |
| 8 | 275 | 6 | 168 | 288 |
| 9 | 290 | 6 | 188 | 235 |

[1] Cured two minutes at 600° F.

CONTROL

The procedure of the preceding examples was used except that no carbohydrate was added and only trimethylolphenol was employed. 151 g. of a 70% aqueous solution adjusted to pH 7.0±0.1 which had an N.V.M. content of 60% (therefore containing 91 g. N.V.M. or 105 g. trimethylolphenol) was added to the sand at a temperature of 330° F. The results are given below:

Table VI

| Composition | Sand Temp., °F. | Mulling Time (min.) | Fusion Point, °F. | Tensile Strength (p.s.i.)[1] |
|---|---|---|---|---|
| Control A | 330 | 5 | 159 | 269 |
| Control B | 330 | 9 | 188 | 141 |

[1] Cured two minutes at 600° F.

The effect of the carbohydrate content on the tensile strength can be seen from the following data.

Table VII.—Tensile strength, p.s.i.[a]

| Coated Sand of Ex. No. Carbohydrate Content [b] | Control 0 | 4-6 28.6 | 1-3 57.1 | 7-9 85.7 |
|---|---|---|---|---|
| Fusion Point, °F. [c]: | | | | |
| 150 | | | 587 | 309 |
| 160 | | 269 | 389 | 504 |
| 170 | | | 323 | 288 |
| 180 | | | | 499 |
| 190 | | 141 | 309 | 235 |
| 200 | | | 179 | 237 |

[a] Test specimens cured 2 minutes at 600 °F.
[b] of the coating solution, in parts by weight per 100 parts by weight of trimethylolphenol.
[c] ± 4°F.; the exact values appear in each example.

EXAMPLE 10

To determine the effect of variations in the pH of the coating solution, two 120/29.4 BRLA-1030/ "Sweetose C" mixtures, 12-1 and 12-2, were made up as in Example 5. They were adjusted to a pH of 2.0 with 37% HCl.

144 g. of the first mixture (12-1 was added to sand heated to 230° F. Half of this mixture (12-1A) was mulled six minutes and the remainder (12-1B) nine minutes.

144 g. of the second mixture (12-2) was added to sand heated to 235° F. Half of this mixture (12-2A) was mulled for six minutes and the remainder (12-2B) for twelve minutes. The following results were obtained. Example 5 is included for comparison.

Table VIII

| Composition | pH | Sand Temp., °F. | Mulling Time (min.) | Fusion Point °F. | Tensile Strength (psi.) |
|---|---|---|---|---|---|
| 5 | 7 | 328 | 6 | 170 | [2] 323 |
| 12-1A | 2 | 230 | 6 | 150 | [1] 304  [2] 272 |
| 12-1B | 2 | 230 | 9 | 180 | [1] 227  [2] 216 |
| 12-2A | 2 | 235 | 6 | 169 | [1] 243  [2] 207 |
| 12-2B | 2 | 235 | 12 | 193 | [1] 206  [2] 195 |

[1] Cured for one minute at 600° F.
[2] Cured for two minutes at 600° F.

Comparison of the above data points up the fact that the reduction in pH value from 7 to 2 lowered by 100° F. or more the sand temperature required to achieve adequate coating of the sand. These differences lower process costs appreciably; however, the tensile strength provided by the low pH solution coated sand was lower although adequate for some applications.

The unexpected combination of properties exhibited by the coated sand of this invention, notably, the non-sintering attribute in combination with a high degree of flow during cure, and, consequently higher shell strength, is a result apparently of the unique characteristics of the "B" stage thermosetting coating. This combination of properties is different from and superior to those displayed by sand coated with either trimethylolphenol itself, a resole itself or even with mixtures of a carbohydrate and a resole—including the highly methylolated, water-soluble, phenol-formaldehyde resoles.

What is claimed is:

1. An inorganic particulate material coated with a coating composition comprising 10 to 300 parts by weight of a water-soluble carbohydrate and 100 parts by weight of 2, 4, 6 trimethylolphenol.

2. A shell mold formed from the coated grains claimed in claim 1.

3. The coated inorganic particulate material claimed in claim 1 wherein said coating composition is partially cured and has a fusion point of from about 150° to 200° F.

4. An inorganic particulate material coated with a coating composition having a pH below about 8 comprising 25 to 100 parts by weight of a water soluble carbohydrate and 100 parts by weight of 2, 4, 6 trimethylolphenol.

5. An inorganic particulate material coated with a coating composition having a pH about 7 comprising 55 to 60 parts by weight of a water soluble corn syrup having a dextrose equivalent of 50 to 65 and 100 parts by weight of 2, 4, 6 trimethylolphenol and about 2 to 5% by weight based on binder solids of a lubricant.

6. A method of coating granular material useful in the formation of shell molds and the like which comprises the steps of forming a thermosetting mixture of 10 to 300 parts by weight of a water soluble carbohydrate with 100 parts by weight of 2,4,6 trimethylolphenol, applying the mixture as a coating to granular material, and partially curing the mixture to form a "B" stage resin coating on said granular material.

7. A method of coating sand grains which comprises heating said sand grains to a temperature of from 225° to about 375° F., thoroughly mixing said heated sand grains with an aqueous solution of 10–300 parts by weight of a water soluble carbohydrate and 100 parts by weight of 2, 4, 6 trimethylolphenol to coat said sand grains therewith, eliminating the water from said solution, and partially curing the coating on said sand grain to a fusion point between about 150 and 200° F.

8. A shell mold formed from sand grains coated according to the method claimed in claim 7.

9. A method of forming shell molds which comprises the steps of heating sand grains to a temperature above 225° F., thoroughly mixing with said heated sand grains a mixture comprising 10–300 parts by weight of a water soluble carbohydrate and 100 parts by weight of 2, 4, 6 trimethylolphenol in an amount sufficient to provide about 2 to 8 parts by dry weight of said mixture per 100 parts by weight of said sand grains thereby coating said sand grains with said mixture, partially curing said mixture to a fusion temperature between 150 and 200° F. and molding said coated sand grains into a shell mold.

References Cited in the file of this patent

UNITED STATES PATENTS

| 1,593,342 | Meigs | July 20, 1926 |
| 2,362,086 | Myers et al. | Nov. 7, 1944 |
| 2,609,352 | Kvalnes | Sept. 2, 1952 |
| 2,683,296 | Drumm et al. | July 13, 1954 |
| 2,825,107 | Schueler | Mar. 4, 1958 |
| 2,841,845 | Bleuenstein | July 8, 1958 |

OTHER REFERENCES

Martin: "The Chemistry of Phenolic Resins," pages 32, 33, 47 and 93, published 1956.

Carswell: "Phenoplasts, Their Structure, Properties and Chem. Technology," pages 10 and 11, published 1947.